United States Patent [19]

Flug et al.

[11] Patent Number: 5,381,547

[45] Date of Patent: Jan. 10, 1995

[54] METHOD FOR DYNAMICALLY LINKING DEFINABLE PROGRAM ELEMENTS OF AN INTERACTIVE DATA PROCESSING SYSTEM

[75] Inventors: Christian Flug, Munich; Dieter Kolb, Germering, both of Germany

[73] Assignee: Siemens Aktiengesellschaft, Munich, Germany

[21] Appl. No.: 853,710

[22] PCT Filed: Oct. 24, 1990

[86] PCT No.: PCT/EP90/01804

§ 371 Date: May 28, 1992

§ 102(e) Date: May 28, 1992

[87] PCT Pub. No.: WO91/08534

PCT Pub. Date: Jun. 13, 1991

[30] Foreign Application Priority Data

Nov. 29, 1989 [EP] European Pat. Off. ......... 89121992

[51] Int. Cl.⁶ .............................................. G06F 9/44
[52] U.S. Cl. .............................. 395/700; 365/DIG. 1
[58] Field of Search ........................................ 395/700

[56] References Cited

U.S. PATENT DOCUMENTS 4,558,413  12/1985  Schmidt et al. ............... 364/300
5,247,681   9/1993  Janis et al. ................... 395/700

OTHER PUBLICATIONS

"Extending the operating system to support an object-oriented environment" by J. A. Marques et al., Oct. 1989, pp. 113-122.

"Automatic descriptor decoding" by J. P. Benkard et al., IBM Technical Disclosure Bulletin, Jun. 1973, pp. 180-182.

"Internal Design of CMU Common Lisp on the IBM RT PC", D. McDonald et al., Sep. 1987, pages.

"Extending the Operating System to Support an Object-Oriented Environment" by Jose Alves Marques et al., OOPSLA 1989 Proceedings Oct. 1-6, 1989, pp. 113-122.

Primary Examiner—Kevin A. Kriess
Assistant Examiner—Matthew M. Payne
Attorney, Agent, or Firm—Hill, Steadman & Simpson

[57] ABSTRACT

In contrast to previous methods, for example for LISP systems, a central function caller with its complex status inquiries is not required, since a data structure with a link header is provided, to which directly executable execution code is always chained. Depending on the type of function and depending on the respective status of a definition of the program element, it is possible to provide here as execution code an error interface for undefined functions, a simulator interface for functions to be simulated, an interpreter interface for functions to be interpreted or a compiled program section for already compiled functions. As a result of dispensing with the status inquiries, it is possible to achieve considerable acceleration of the program execution, in particular for LISP systems, in which a function call often occurs for usually only short function operations.

11 Claims, 11 Drawing Sheets

```
·(FOO 3)
function FOO is undefined
·(DEFUN FOO (X) (FIE X))
FOO
·(FOO 3)
function FIE is undefined
·(COMPILE 'FOO)
FOO
·(FOO 3)
function FIE is undefined
·
```
910.1

FIG. 1.2

```
·(DEFUN FIE (Y) (FEE Y))
FIE
·(DEFUN FEE (Z) (2+ Z))
FEE
·(DEFUN 2+ (X) (+ X 2))
2+
·(COMPILE '2+)
2+
·(FOO 3)
5
·
```
910.2

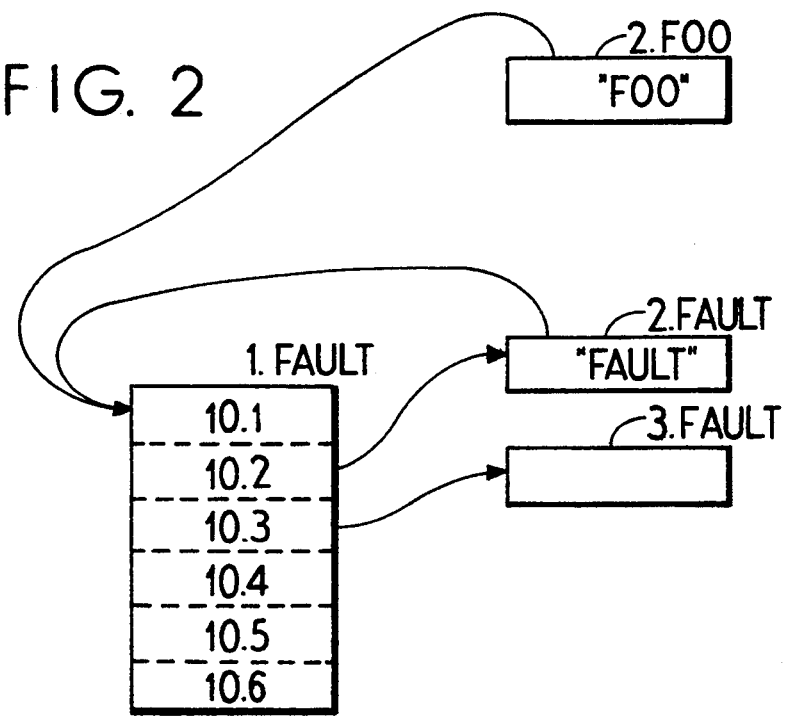
FIG. 2
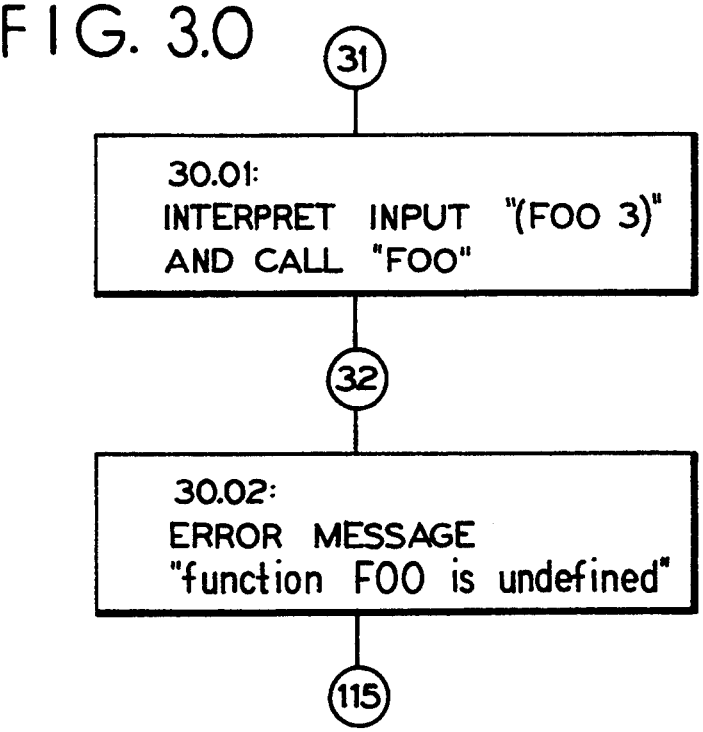
FIG. 3.0

FIG. 3.1
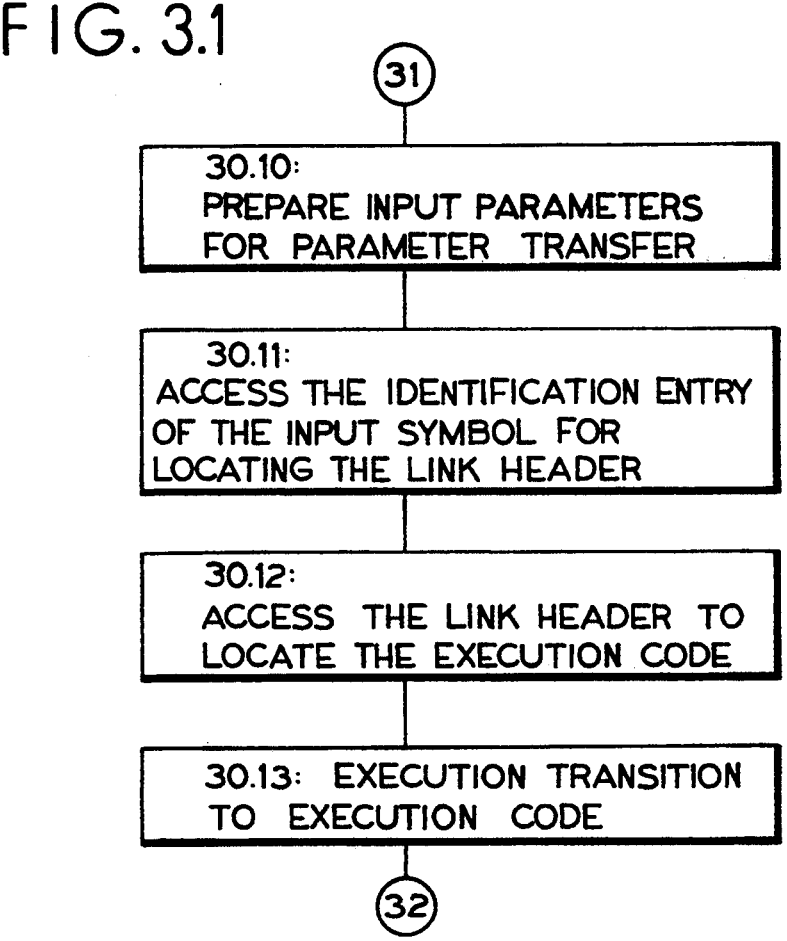
FIG. 3.2
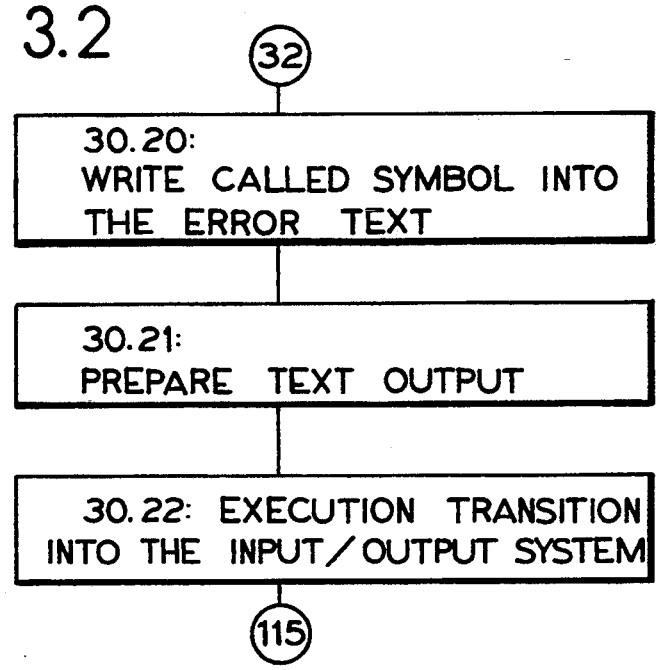

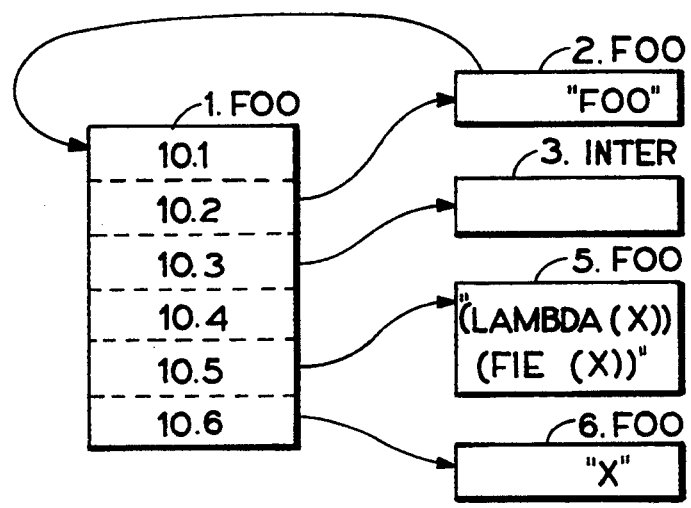
FIG. 4.1
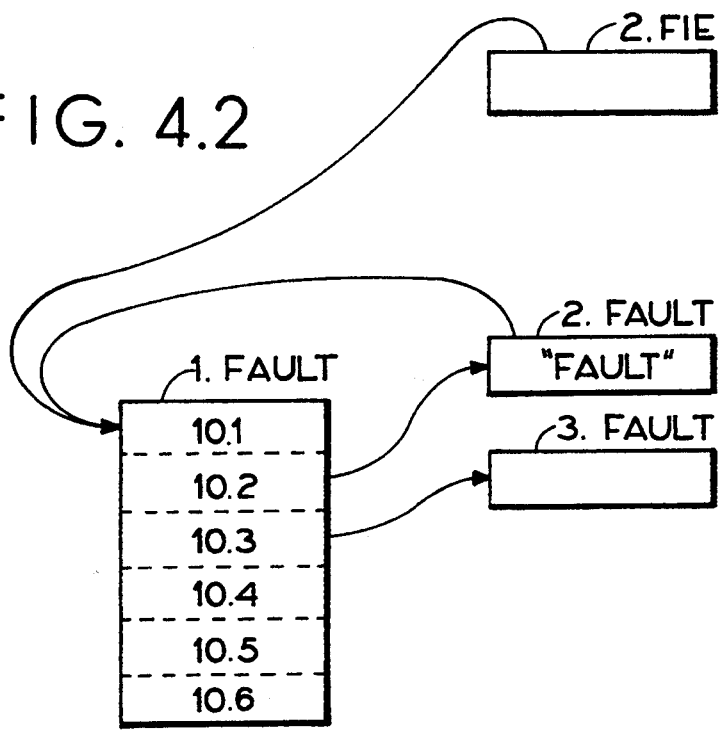
FIG. 4.2

FIG. 5.0
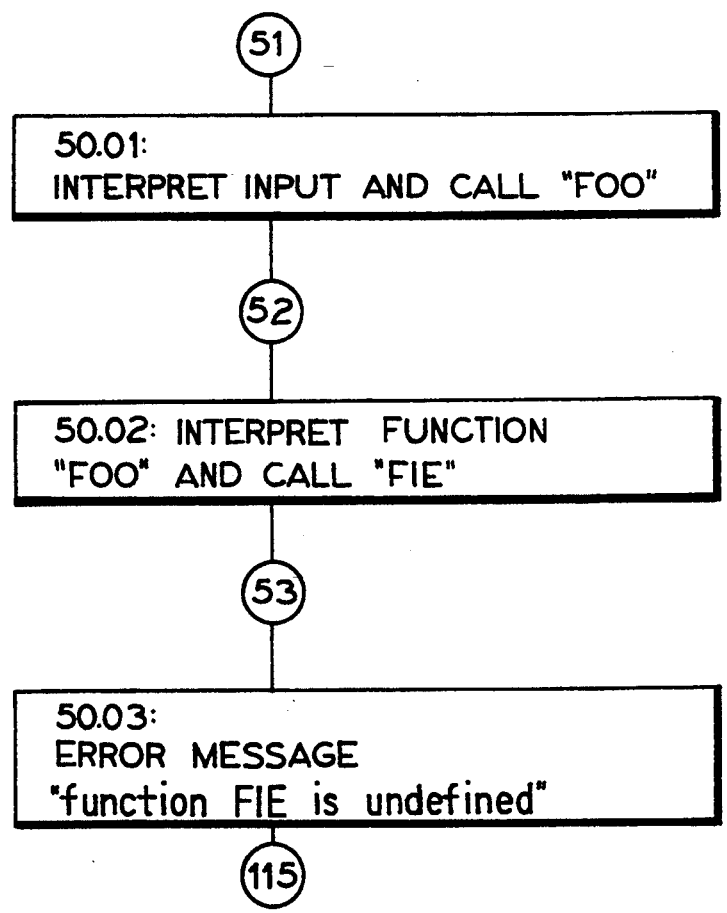
FIG. 5.1
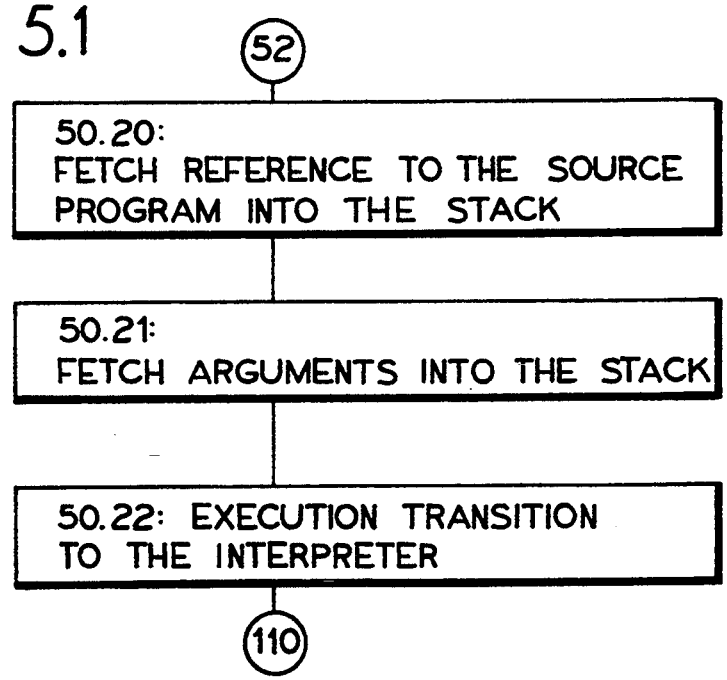

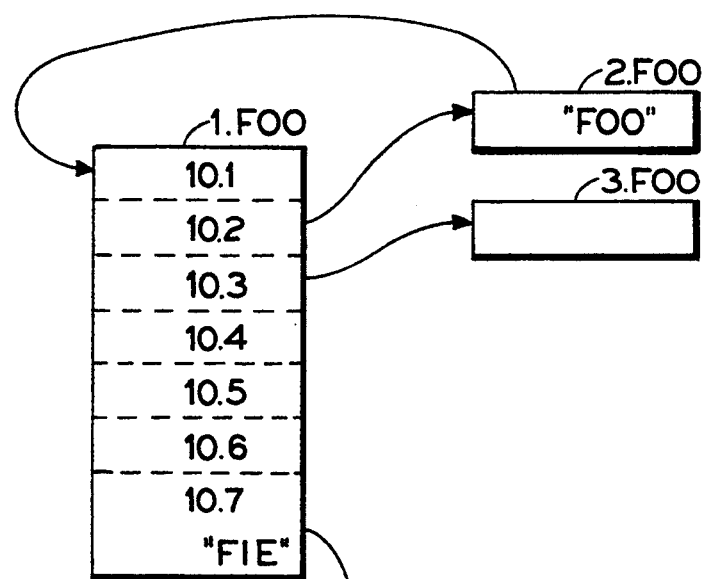
FIG. 8.1
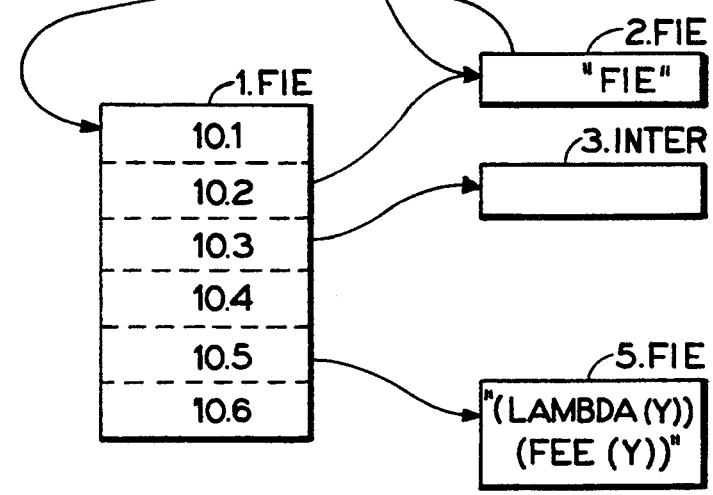
FIG. 8.2
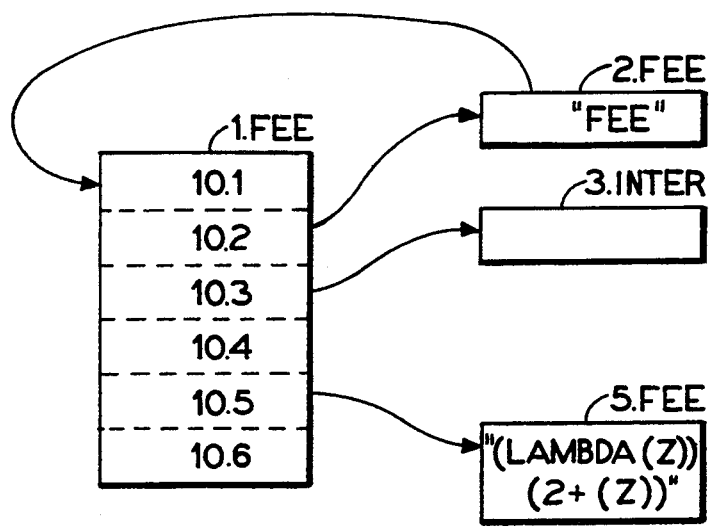

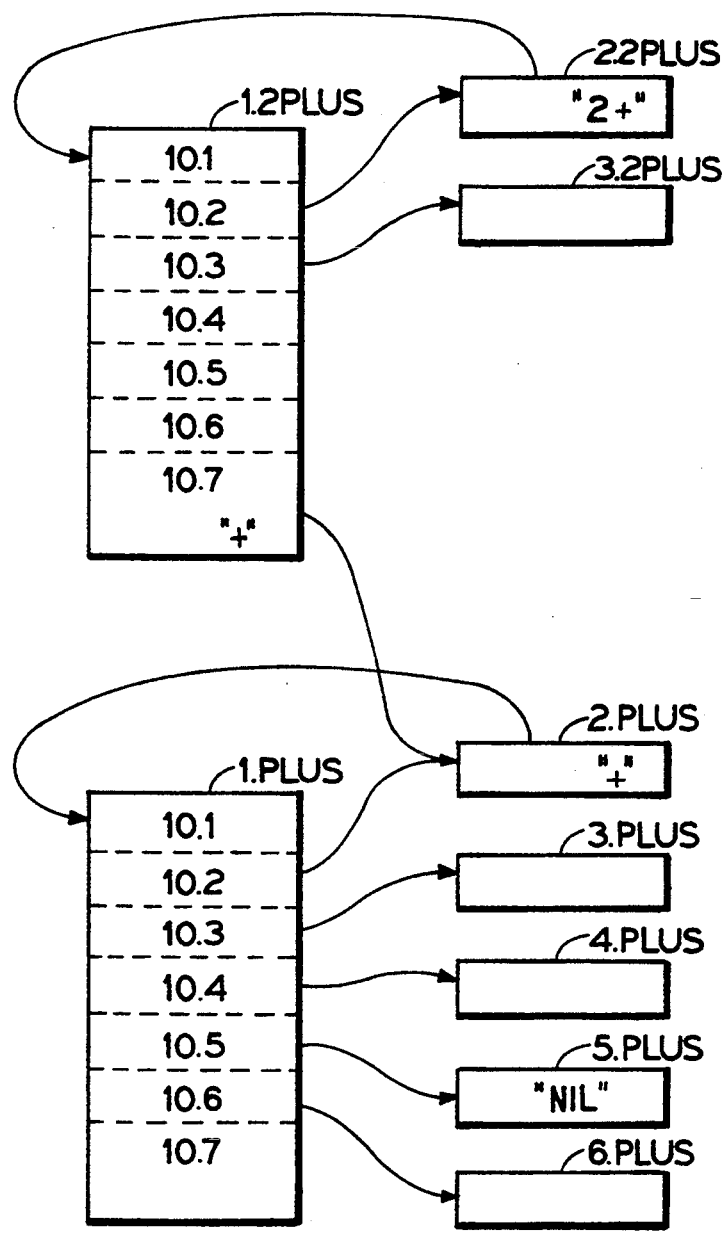
FIG. 8.3

METHOD FOR DYNAMICALLY LINKING DEFINABLE PROGRAM ELEMENTS OF AN INTERACTIVE DATA PROCESSING SYSTEM

BACKGROUND OF THE INVENTION

A method of this type is used in particular in interactive development environments. Currently there are a wide variety of interactive systems for commercial application, ranging from very expensive mainframe computers down to small PCs. For example, the programming system LISP (list processing) is one of the many systems of this type known at present. For example, in 1985 the so-called "Spice LISP" was implemented as a variant of "Common LISP" at the Carnegie-Mellon University (CMU) on a computer manufactured by Perq. Systems Corporation. The authors David B. McDonald, Scott E. Fahlmann and Skef Wholey describe under the title "Internal Design of CMU Common Lisp on the IBM RT PC", September, 1987, CMU-CS-87-157, the exact details for an implementation of "Common LISP" in a Mach operating system which is compatible with Berkeley Unix 4.3. In particular, beginning with page 35, it is stated that a large number of inquiry operations are required for function calls to determine the current status of the called function. The status of a called function or program element refers to its form in being, for example, interpretable code, source code, object code or code to be simulated. In-line operations are provided here for so-called evaluation of the arguments. Then so-called out-of-line operations are provided which are realized as a central function call program and have different program parts for a compiled function and a list to be interpreted. If the called function can be represented by a symbol, a link table can be used, which is constructed from double words and initially references the central function call program, which from case to case enters a reference to the function program.

An operating system platform based on a virtual machine is described by the authors José Alves Marques and Paulo Guides under the title "Extending the Operating System to Support an Object-Oriented Environment" in the Proceedings of Object-Oriented Programming: Systems, Languages and Applications (OOPSLA '89), ACM, 1st to 6th Oct. 1989, New Orleans, La., USA, on pages 113 to 122. Objects can be classified in their object classes on the basis of type definitions of the user, consisting of operations and attributes. The objects can be referenced as active or passive objects, in that each object notified to the system is assigned its own identifier in each case, so that objects can be called uniformly and transparently. Access transparency independent of residence in a mass storage means or a main memory allows a dynamic linking to be available to an execution system and erroneous object accesses to be detected. As a result of synchronizing rules for a synchronizable object, synchronization takes place in the case of contending accesses. Error transparency of the system is provided, in that an error containment can be defined for atomic objects. A virtual architecture is provided in which management areas (domains) can be defined. The address space is divided on the one hand into a virtual object memory for calls and instantiation of objects during the execution of a job, and on the other hand into a storage system for objects outside the execution of jobs. Operations for objects are identified using a method identification, by means of which a virtual address for the operation can be taken from a method table, which address is assigned to the operation as allocated method. Reference to the associated entry in the method table for the referenced method is made during dynamic linking. The object structure is formed on the one hand by data objects which contain instantiation data, and on the other hand by implementation objects which contain the execution code for all objects of a particular implementation type. A data block is used as information header, in which the information required by the system for an object, for storing it, for calling it and also for access protection for an object, is entered. When an object is called an object reference, an operation identification and also a parameter list is prepared by the calling activity for a system call. In the case of a remotely stored object, the activity is distributed among the remote system nodes in which the remote object is stored. When the object is searched for, first of all a context object table in which the information headers are referenced for the objects associated with the job context is searched. In the case of an implementation object, an attempt is made using a node object table to locate the sought object in its own node, possibly in another job context. In the case of a data object, a distinction is drawn between non-synchronizable, synchronizable and atomic objects, in that an object storage table is to be checked, in particular in the case of multiple copies for a non-synchronizable object.

A method is described by the authors J. P. Benkard and J. P. Gelb under the title "Automatic descriptor decoding" in IBM Technical Disclosure Bulletin, Volume 16, No. 1, June 1973, on pages 180 to 182, in which method an instruction is decoded, from which data are used which are to be interpreted by means of a data descriptor. It is to be possible to change the data descriptor during execution, so that it is always necessary to interpret it anew when decoding the instruction. An addition is given as an example in which the operands are examined step by step to determine, for example, whether a conversion from a fixed-point format to a floating-point format is required. For the decision a plurality of table-like filters are used, the table entries of which determine the handling to be executed for the data to be used, in particular correspondence tests, preparations, type checks and conversions.

SUMMARY OF THE INVENTION

The object of the invention is to state a further method for dynamically linking program elements of an interactive system.

This object is achieved by a method for dynamically linking program elements of an interactive data processing system, in which it is possible to define operations of the interactive data processing system by the program elements, having the following features:
 a) a link header is assigned or associated to each program element as a data block for storing chaining information, so that a respective current status of a definition of the program element can be determined by the chaining information as a dynamically linked operation,
 b) an execution code of the program element which corresponds to the current status of the program element is chained to the link header,
 c) each time the definition of the program element is changed, a new link header is generated with an execution code corresponding to the new definition which is chained to the link header, d) when a program element is used, then the chained execution code is accessed via the assigned link header and the execution code is executed.

The invention is based on the finding that status inquiries are not required if the execution code which corresponds to a respective current status of an interactively definable definition for the program element is executed directly by means of access to a data structure.

The method according to the invention is here a hardware-independent software solution. As a result, in a particularly advantageous manner this method is not dependent on the type of data processing system, and it can thus be used for almost every interactive system such as, for example, programming systems for Prolog, rapid prototyping, object-oriented systems and in particular LISP systems. A hardware-independent data representation model for the link headers and the chained execution code vectors can likewise be achieved in a particularly advantageous manner. Since the dynamic linking of program elements occurs particularly frequently in interactive systems, as a result of dispensing with the frequently very complex status inquiry operations a reduction in the program runtime for interactive development systems can be advantageously achieved. Likewise, a reduction in the runtime for applications with dynamic linking, for example in the field of object-oriented programming, can be advantageously achieved.

A common link header with an execution code for a default routine can be chained for all undefined or as yet undefined program elements. In this way it is possible to use such program elements in a uniform manner, like the program elements already defined at the time of execution, so that no inquiries about the current status of the definition of the program element are required at runtime. A reference can be used here as a link in such a way, for example, that a direct address of the memory is entered, or, for example, that a pointer is used for a concealed addressing, or, for example, that a reference is used in the form of an encryption so that the addressing can be determined by means of a decoding process.

In the systems known to date, for example in the "CMU Common LISP" mentioned at the beginning and described in the aforesaid publication, the central function caller with its numerous status inquiry operations is always called up, for instance via a link table, for the undefined functions, whereas with the method according to the invention a direct transition to the execution code for, for example, error handling can be executed, so that status inquiry operations are not necessary.

Frequent applications emerge, for example, for procedures, methods and functions. As a result of the use of the link header, the frequently complex inquiry routine with respect to the status of the definition can be omitted. During a compilation, for example, only a few execution instructions need be expanded for access to the data structure of the program element in order to use such program elements, so that these execution instructions can be assembled in a decentralized manner, which is frequently also referred to as "in-line". In contrast to previous interactive programming systems, calling a larger central program part for dynamic linking can be dispensed with. In previous interactive systems, said central program part is addressed, for example, via a link table when an already compiled function is first called, as was mentioned at the beginning. With many other previous applications, a direct call of a central program part is always provided. Many further previous applications use, for example, an illegal instruction code so that a hardware routine is triggered, by means of which the central program part is eventually reached. This is frequently referred to as a "trap routine".

Regardless of the respective current status of the definition of the program elements, the respective associated link header can always be used in an identical manner for dynamic linking, for example for so-called locally definable program elements, for which the link header can be used locally in each case.

A preferred embodiment of the invention is characterized in that the program element receives an identification entry referencing the link header for easier location of the link header. In particular also for globally definable program elements, the associated link header can consequently be located more easily. This can be advantageously employed, for example, for language elements that can be identified by a global symbol. A so-called default identification entry can be provided, for example, for as yet undefined or no longer defined program elements, which is chained with a so-called default link header, to which a so-called default execution code is chained for error handling in the case of an occasional use of such a program element.

A further preferred embodiment of the invention is characterized in that one of the following execution codes is chained to each link header:

a) an error interface to an error handling program for an as yet undefined or no longer defined program element, b) a simulator interface to a simulator program for a program element to be simulated, c) an interpreter interface to an interpreter program for a program element to be interpreted, d) a compiled program sequence for a compiled program element.

Depending on the application, overall at least one, or more than one, or all, of the execution codes listed is/are provided for use in the interactive system. The execution code which can be chained to the link header can be created here only once for all such link headers for common use. A separate execution code vector may also be provided for each link header. Said vector can be processed, for example, by a so-called garbage collector to eliminate data structures that are no longer required.

In LISP systems for example, frequently only the execution codes for the error interface, for the interpreter interface and compiled program sequences can be provided, so that the simulator interface, for example, is not used in such systems. Likewise, in interactive simulator systems for example, only the execution codes for the error interface, for the simulator interface and compiled program sequences can be provided, while the interpreter interface, for example, is not used in such systems. Likewise, in other interactive systems for example, only the execution codes for the error interface and compiled program sequences can be provided, so that the simulator interface and the interpreter interface are not used. In this case, said compiled program sequences may also be other interface operations, in accordance with the respective program element of the respective interactive system. Accordingly, the error interface, the interpreter interface, and also the simulator interface can be regarded as a special case of a compiled program sequence. In a LISP system, for example, local or global compilations or definitions of functions, macros or special forms can be provided as compiled program sequences for an interface.

A further preferred embodiment of the invention is characterized by the program elements of a LISP system. The LISP system can be integrated in a system here. Functions are frequently referred to as "first-class" objects in LISP. In other words, like variable values they can be passed on as arguments or return values. The identification entries can be used for the LISP symbols. A link header, which is frequently also referred to as the function header, can be generated, for example for the common LISP language elements DEFUN, LAMBDA, FLET, LABELS, FUNCTION and DEFMACRO. Function headers can likewise be generated for so-called compiled files generated by the compiler or by the loader, and likewise also for local functions and for unnamed LAMBDA expressions. A uniform data structure should be provided here for the function headers, for example for compiled functions, system functions and functions to be interpreted, so that identical data access is ensured for all function types and function statuses. Specifically when calling a function to be interpreted, no special measures and in particular no inquiries about the status of the called function should be required for a calling compiled function in the compiled program sequence of the execution code. This would slow down execution. The same structures of the entries as in the function header of a complied function should therefore be provided, for example, in the function header of a function to be interpreted.

The length of the function header can then be noted in the function header. The function type can likewise be marked, for example of a function to be interpreted, of a compiled function, of a so-called special form or of a macro.

Each globally defined function should have an identification entry for the symbol in which the function name and a link to the function header are to be stored.

Function calls in a compiled function can be carried out, for example, in such a way that the function header, and consequently the execution code to be executed, is accessed via the respective identification entry of the symbol. The first execution instruction of the executable execution code is to be branched to after the parameters to be transferred have been supplied, which can either be supplied in so-called frames which are frequently stored in a so-called runtime stack for example, or which can also be transferred in registers for example. An executable execution code can be located in this way for each symbol with an identification entry. Checking whether a function to be called, for example, is present in compiled form is therefore not necessary at the time of execution. In the case of a function to be interpreted, the interpreter interface can be called here as an execution code, by means of which the LISP language elements to be interpreted, for example a LAMBDA list, can be fetched from the function header as a source program, and which can be passed on together with the parameters supplied to the interpreter that can be called after. In the case of functions to be simulated, instead of the source, program, in a similar manner an interface description can be passed to the simulator. By using identical code sections of the execution code of the interpreter interface, this code section need be present only once in the memory. The same applies to the corresponding code section of the execution code of the simulator interface. The same likewise applies to the corresponding code section of the error interface. Since a function header can be assigned to the as yet undefined or no longer defined, that is to say the so-called undefined, functions and symbols, to which function header an error interface, which can be called in the same way, is chained as execution code, it is not necessary to check the status of the definition at runtime. The corresponding error message that the function is undefined can be obtained by calling the error system as error handling program.

A further preferred embodiment of the invention is characterized in that at least one of the following data entries is entered in the link header of the program element:

a) a data entry as an identifier entry of the link header with a length specification for the link header, b) a data entry as link to the identification entry of a symbol which is associated with the program element, c) a data entry as link to the execution code, d) a data entry as link to an environment block, e) a data entry as link to a function source, f) a data entry as link to parameters, g) a data entry as link to a symbol or a constant which are used by the program element.

Depending on the application, overall at least one, or more than one, or all, of the aforesaid data entries is/are provided for use in the LISP system. The link header can be designed here as a so-called G vector. This can be correspondingly noted in the identifier entry of the link header with the length specification for this data vector. In particular for global functions, special forms and compiled closures, a link to the symbol should be provided. The link to the execution code should always be present. The link to the environment block, which is created for example for local functions to create environments, can be entered if required. The link to the function source, for example to a list to be interpreted, should always be entered in a link header of a function to be interpreted. Said link can be present in a link header for a compiled function even if it is not used. The link to the parameters can be used for the processing of the parameter list, in particular for debugging purposes. Particularly in the case of link headers of compiled functions, the link to further symbols or constants can be used, in particular for executing links or function calls from the execution code. It is also possible to provide a plurality of identical data entries here, depending on the length of this function-specific symbol table.

Said function-specific symbol table can be provided in each function header of a compiled function, and contain the links to the symbols of the function names which are called by the function. The pointer to the symbol for a function to be called can be determined with a fixed compiled offset relative to the vector start of the function header. It is possible to provide as component for said symbol the identification entry of the symbol, to which the function header is chained as further component of said symbol of the function to be called. The execution code which can therefore be reached by means of this triple indirection can be chained to the function header of the execution code as further component of a symbol of the function to be called.

Said function-specific symbol table is frequently not provided in the function header of an interpretable function, and is frequently not required either since instead of the function-specific compiled execution code, which runs with fixed compiled function-specific accesses to the function-specific symbol table, for example in the case of internal function calls, the same execution code is provided for all interpretable functions in the form of an interpreter interface for the transition to the interpreter, the coded instructions of which are to remain invariant. For example, a reference to the source program can be brought by the interpreter interface into the stack, for example into the so-called runtime stack. In this case, the interpreter interface can successively bring the individual arguments into the stack before the transition to the interpreter is executed. The latter can consequently link the arguments to the parameters of the source program. The source program can then be evaluated. A symbol found can be evaluated accordingly here, depending on, for example, whether a function, a macro or a special form is present. This may be evident, for example, from the identifier entry of the link header.

In the case of a symbol of a function to be called being found, the function header of the function to be called can be brought into the stack as first element. The arguments of the function to be called can be brought into the stack as further elements. It is possible to simulate the interface to a, for example, compiled function to be called by a program part written in Assembler, as a result of which the elements from the, for example, global registers can be brought into the stack. Said program part can be assembled in-line. As soon as the interpreter is to transfer the return elements from the stack into the, for example, global registers, it can use for this purpose, for example, a program part likewise written in Assembler. The latter can likewise be assembled in-line. The transferred elements, which are present in the stack and hence belong to the so-called frame of the caller, are to continue to exist after said Assembler program parts have been exited. This can also be employed, for example, for so-called MULTIPLE-VALUES, the transfer values of which may also be contained in a global return buffer. In this way the arguments for the called compiled function can be checked. It is possible to construct a frame on the stack, it being necessary to bring the arguments to the correct positions in the frame. This frame can be dismantled again after the return of the compiled function.

If a compiled function calls an interpretable function, the program transition to the interpreter interface should be effected. The program part likewise written in Assembler can be used here in the interpreter interface and can take the arguments from the registers or from the stack to form a vector, which is frequently also termed "packing in", it being possible to bring said vector into the stack. A reference to this vector can be transferred here to the interpreter interface for the execution of the evaluation. In this manner, for example, the arguments can be prepared for the interpreter without special measures, or inquiries as to whether the called function is to be interpreted, being required in the calling compiled function.

Owing to the program parts written in Assembler, stacks can also be designed as hardware stacks in a simple manner. The stack operations can consequently be advantageously adapted to the hardware of the target computer. Such stack operations are supported by many processors with different hardware features in various cases, for example local registers, automatic storage of return addresses, etc. Specific stacks can be designed here as pure software stacks, for example a stack for the dynamic value links of the variables declared to be SPECIAL. Furthermore, a stack can be provided for storing, for example, value links of the argument names and local variables. This may be provided as a pure software stack, or be integrated in a hardware stack. With Common LISP for example, a further stack can be provided for local functions generated with the language elements FLET and LABELS for managing their visible lexical environments.

A virtual machine with a virtual intermediate language can be defined for the LISP system for an access to the stack, which is frequently to be carried out with utilization of the hardware support of the target computer system. During compilation a so-called "front-end" can then handle the virtual machine and a so-called "back-end" can carry out the adaptation to the actual target computer. For example, with the aforementioned in-line compiled program parts used in the LISP system, the "back-end" handles the expansion and assembling of the instructions in the machine language of the actual target computer. In this way, for example, stack operations and other operations with constants, variables or other LISP objects can be executed, with the fetching of the arguments into the stack, with the execution of the operations to be executed, and with the preparation of results required from case to case for further handling.

In particular a high degree of portability can be achieved in this way.

A HASH coding can be used for the processing of identification entries. In this case, during the first access to a symbol, which has thus never been used prior to this time, an identification entry for said as yet undefined symbol can first be generated directly as a result of this access as an identification entry for an as yet undefined symbol.

An INTEL 80960 microprocessor from INTEL can be used as the processing unit for example. A similar RISC-type microprocessor which has many registers and is suitable in particular for register operations can likewise also be used. Such a microprocessor, for example with 16 global registers and 16 local registers, which are frequently also termed stack registers, is often suitable, for example, for many small functions, as frequently occur in LISP applications, as a result of which it is possible to support the stack operations. The local registers can be used advantageously in particular when constructing or dismantling a frame, which is formed from a group of stack entries.

While one exemplary embodiment of the invention has great advantages as a pure software solution, for instance in the form such that the stacks are also pure software stacks, in particular for the portability of the LISP system according to the invention, in an interactive system for a mainframe system for example, the best possible hardware support can be sought, for instance in the form such that the accesses to the data structure of the program elements according to the invention are also executed in part or else wholly by circuits or circuit parts provided specifically for this purpose, which can be realized in an execution part of a processing element of the processor arranged specifically for this purpose, in particular for the best possible acceleration of the processing. This embodiment variant is often also referred to as the "casting in hardware" of processing steps. In this case these are the method steps according to the invention.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, and in which:

FIG. 2 shows a data structure for an as yet undefined function "FOO".

FIGS. 3.0, 3.1, 3.2 show a flowchart for an entered call of an as yet undefined function "FOO".

FIGS. 4.0, 4.1, 4.2 show a data structure for an interpretable function "FOO" and an as yet undefined function "FIE".

FIGS. 5.0, 5.1, 5.2 show a flowchart for an entered call of an interpretable function "FOO" which calls an as yet undefined function "FIE".

FIGS. 8.1, 8.2, 8.3 show a data structure for a compiled function "FOO", an interpretable function "FIE", an interpretable function "FEE", a compiled function "2+" and a system function "+".

DESCRIPTION OF THE PREFERRED EMBODIMENTS

Figure 1:
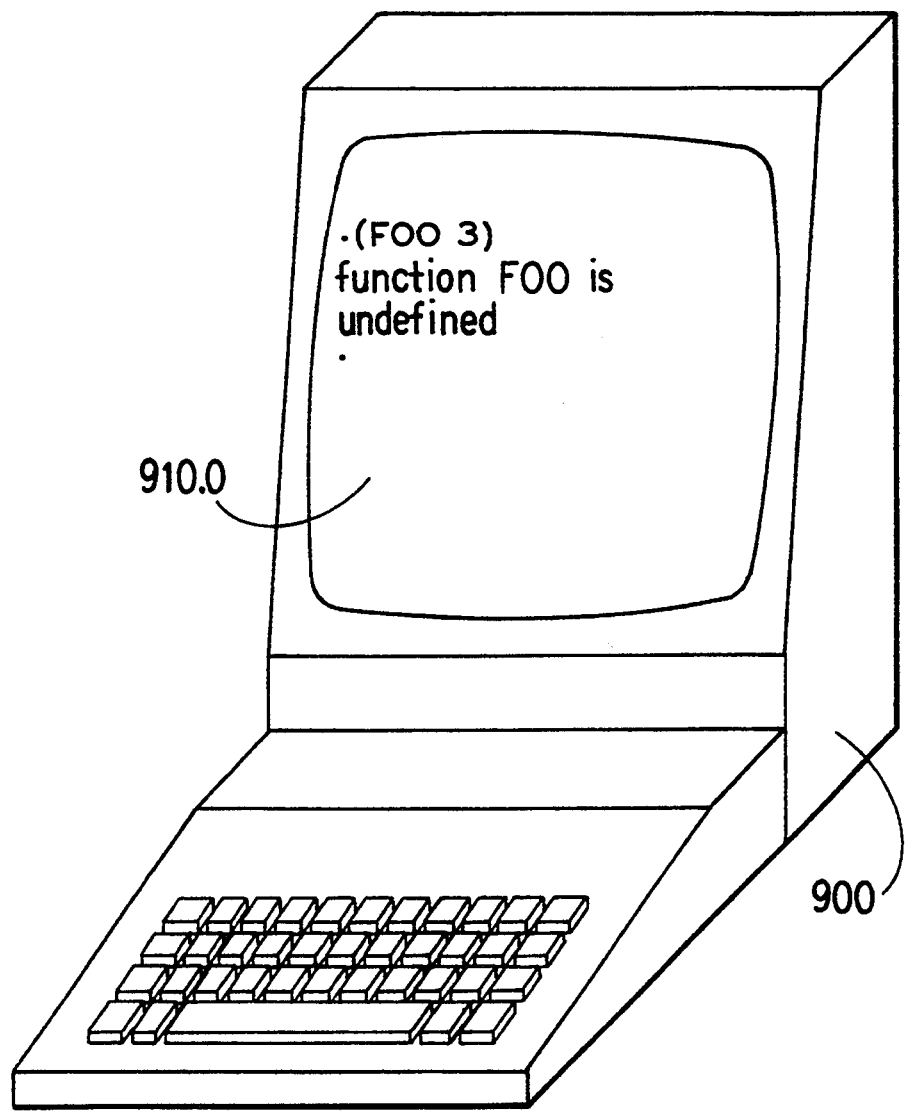
FIGS. 1.0, 1.1, 1.2 show a personal computer and its screen with inputs/outputs for carrying out an exemplary embodiment.

As FIG. 1.0 shows, in this exemplary embodiment a personal computer 900 is used. A LISP system according to the invention has been loaded and started on said computer. A prompt "*" for input is output in the first line on a screen 910.0 of the personal computer 900.

The following input is made:

(FOO 3)

This input is interpreted as a so-called "reader" of the interpreter and, since the symbol "FOO" has not yet been defined at this time, the following error message is consequently output in the next line:

function FOO is undefined

The prompt "*" for a further input is then output in the next line.

As FIG. 1.1 shows, in which the screen 910.1 is illustrated with further inputs/outputs, the following second input is then made:

(DEFUN FOO (X) (FIE X))

The input is processed and the function "FOO" is defined as interpretable. The symbol "FOO" is then output in the next line as an acknowledgement of the successfully processed input. The prompt "*" for a further input is output in the next line. The following third input is made:

(FOO 3)

This input is interpreted and the interpretable function "FOO" is called. The function body contains the symbol "FIE", which is not yet defined at this time, so that the following error message is output in the next line:

function FIE is undefined

The prompt "*" for a further input is then output in the next line. The following fourth input is made:

(COMPILE 'FOO)

This input is processed and the function "FOO" is compiled, and is then defined as compiled. The symbol "FOO" is then output in the next line as an acknowledgement of the successfully processed input. The prompt "*" for a further input is output in the next line. The following fifth input is made:

(FOO 3)

This input is interpreted and the compiled function "FOO" is called. The function body contains the symbol "FIE", which is not yet defined at this time, so that the following error message is output in the next line:

function FIE is undefined

The prompt "*" for a further input is then output in the next line.

As FIG. 1.2 shows, in which the screen 910.2 is illustrated with further inputs/outputs, the following sixth input is then made:

(DEFUN FIE (Y) (FEE Y))

The input is processed and the function "FIE" is defined as interpretable. The symbol "FIE" is then output in the next line as an acknowledgement of the successfully processed input. The prompt "*" for a further input is output in the next line. The following seventh input is made:

(DEFUN FEE (Z) (2+Z))

The input is processed and the function "FEE" is defined as interpretable. The symbol "FEE" is then output in the next line as an acknowledgement of the successfully processed input. The prompt "*" for a further input is output in the next line. The following eighth input is made:

(DEFUN 2+(x) (+x 2))

The input is processed and the function "2+" is defined as interpretable. The symbol "2+" is then output in the next line as an acknowledgement of the successfully processed input. The prompt "*" for a further input is output in the next line. The following ninth input is made:

(COMPILE '2+)

The input is processed and the function "2+" is compiled, and is then defined as compiled. The symbol "2+" is then output in the next line as an acknowledgement of the successfully processed input. The prompt "*" for a further input is output in the next line. The following tenth input is made:

(FOO 3)

The input is interpreted and the compiled function "FOO" is called, from which the interpretable function "FIE" is called. The function "FIE" is interpreted. The function call "FEE" is found in the function body, and the interpretable function "FEE" is called. The function "FEE" is interpreted. The function call "2+" is found in the function body, and the function "2+" compiled at this time is called, which in turn calls the system function "+", which in turn calls further internal system functions. When it returns, the system function transfers the transfer value "5". This is likewise transferred as the transfer value by the function "2+" when it returns. This transfer value is likewise transferred by the function "FEE" when it returns. This transfer value is likewise transferred by the function "FIE" when it returns. This transfer value is likewise transferred by the function "FOO" to a so-called "PRINTER" of the interpreter when it returns. The latter prepares the output of the transfer value "5" and initiates this, so that as a result "5" is output in the next line on the screen 910.2. The prompt "*" for further inputs is then output in the next line.

This exemplary embodiment contains the program transitions from interpretable and compiled functions to interpretable, compiled, as yet undefined functions and system functions as internal functions. This will be explained more fully below.

As FIG. 2 shows, before the first input of this exemplary embodiment for the as yet undefined function "FOO", the identification entry 2.FOO is provided in this exemplary embodiment, to which a link header 1.FAULT is chained. The latter contains a data entry 10.1, by means of which the link header 1.FAULT is marked as a G vector with its length. The link header 1.FAULT furthermore contains a data entry 10.2, by means of which the identification entry 2.FAULT is chained to the link header 1.FAULT. The link header 1.FAULT furthermore contains a data entry 10.3, by means of which an execution code 3.FAULT is chained to the link header 1.FAULT. The execution code 3.FAULT is here an I vector which contains execution instructions, by means of which an error message can be output if the undefined function is called. The further data entries 10.4, 10.5 and 10.6 are not used in this exemplary embodiment for the output of an error message.

As FIG. 3 shows, after the first input the illustrated program sections are executed, these being combined in FIG. 3.0 into program blocks for an overview.

As FIG. 3.0 shows, the program block 30.01 is executed, beginning with the program connector 31. The first input "(FOO 3)" of this exemplary embodiment is processed, cf. FIG. 1.0. This input is interpreted. The input parameter "3" is prepared for parameter transfer. The input symbol "FOO" is not yet defined at this time. In the LISP system of this exemplary embodiment according to the invention, the identification entry. 2.FOO, which references the function header 1.FAULT to which the execution code 3.FAULT is chained, is already present when the LISP system is started up, cf. FIG. 2. In this exemplary embodiment, a corresponding identification entry 2 is already present for each undefined symbol when the LISP system is started up. Accordingly, when the function "FOO" is called, the identification entry 2.FOO is accessed, then the link header 1.FAULT is accessed, and after that the execution code 3.FAULT is accessed, which is executed at the program connector 32. In this exemplary embodiment, each identification entry 2 of an undefined symbol references the same function header 1.FAULT.

Beginning with the program connector 32, the program block 30.02 follows, by means of which the output of the error message "function FOO is undefined" is prepared. In the program connector 115 a program transition then takes place into the printer of the interpreter and then into the input/output system for executing the output of the error message and for prompting for a further input.

As FIG. 3.1 shows, the input "(FOO 3)" is interpreted, in that the input parameter "3" is prepared for parameter transfer in the program section 30.10, which follows after the program connector 31. In this exemplary embodiment, the parameter transfer takes place in a register, and the symbol entered is transferred in a further register. Program section 30.11 then follows. The identification entry 2.FOO of the input symbol "FOO" is then accessed to locate the link header, which in this case is the link header 1.FAULT. Program section 30.12 then follows. The link header 1.FAULT, which the input symbol references, is accessed to locate the execution code, which in this case is the execution code 3.FAULT. Program section 30.13 then follows. An execution transition to the execution code 3.FAULT takes place at the program connector 32.

The program sections 30 between the program connectors 31 and 32 are here parts of a program which executes a function call on the highest level in accordance with an input. This program part is also often termed the "reader" of the interpreter.

As FIG. 3.2 shows, the program section 30.20 follows after the program connector 32. From the register provided for the transfer of the symbol, the symbol is written into the error text, which in this case is "function FOO is undefined". Program section 30.21 follows. The text output is prepared. Program section 30.22 then follows. The execution transition to the "printer" of the interpreter takes place at the program connector 115, and then into the input/output system. The program sections between the program connectors 32 and 33 are executed here by the execution code 3.FAULT.

The error message "function FOO is undefined" is then output by the input/output system on the screen 910. The prompt "*" for a further input is then made by the input/output system.

As FIG. 4.1 shows, after the second input and before the third input of this exemplary embodiment, the identification entry 2.FOO to which a link header 1.FOO is chained is provided in this exemplary embodiment for the function "FOO" defined as to be interpreted. Said link header contains a data entry 10.1, by means of which the link header 1.FOO is marked as a G vector with its length. The link header 1.FOO furthermore contains a data entry 10.2, by means of which the identification entry. 2.FOO is chained to the link header 1.FOO. The link header 1.FOO furthermore contains a data entry 10.3, by means of which an execution code 3.INTER is chained to the link header 1.FOO. The execution code 3.INTER is here an I vector which contains execution instructions for an interpreter interface, by means of which an interpreter can subsequently be called if the function defined as to be interpreted is called. A further data entry 10.4 of the function header 1.FOO can be used in this exemplary embodiment by the interpreter. The function header 1.FOO contains a further data entry 10.5, by means of which a function source 5.FOO is chained in this exemplary embodiment to the function header 1.FOO as source program for the interpreter in the form of a list to be interpreted. In this exemplary embodiment, said function header is prepared in accordance with the input definition as a LAMBDA list equal to "(LAMBDA (x) (+x 2))". The function header 1.FOO contains a further data entry 10.6, by means of which the names of the parameters of the defined function are chained to the function header 1.FOO. In this exemplary embodiment, the parameter "x" is linked to the function "FOO".

As FIG. 4.2 shows, an identification entry 2.FIE which references the link header 1.FAULT is present at this time for the as yet undefined symbol "FIE". This data structure for an undefined function has already been described with reference to FIG. 2.

As FIG. 5 shows, the program operations illustrated, which are combined into program blocks for an overview in FIG. 5.0, follow after the third input.

As FIG. 5.0 shows, the program block 50.01 is executed, beginning with the program connector 51. The third input "(FOO 3)" of this exemplary embodiment is processed, cf. FIG. 1.1. This input is interpreted. The input parameter "3" is prepared for parameter transfer. The input symbol "FOO" is defined as an interpretable function at this time. As already illustrated in FIG. 3.1, the program sections for the preparation of the input parameter "3" for parameter transfer follow, and for the access to the identification entry 2.FOO for locating the link header, which in this case is the link header 1.FOO. The link header 1.FOO is likewise accessed to locate the execution code, which in this case is the execution code 3.INTER. The program transition to the execution code 3.INTER then takes place at the program connector 52. The identical execution instructions as are illustrated in FIG. 3.1 are executed here. In a completely identical manner a link header can be accessed with the identical execution instructions, although the associated function is present with a completely different definition status in the two cases. This is possible because an identical structure is provided for the data chaining in both cases.

Beginning with the program connector 52, the program block 50.02 follows. The execution code 3.INTER which is provided as an interpreter interface is executed. The source program 5.FOO, which in this case is "(LAMBDA (x) (FIE x))", and the argument "x" is brought into the stack, which in this exemplary embodiment is designed as a so-called runtime stack, for the interpreter and the execution transition to the interpreter takes place. The now following program part is frequently referred to as the so-called "evaluator" of the interpreter.

The interpreter links the input and transferred parameters "3" to "x", the parameter of the source program. The expression "(FIE x)" is evaluated. The symbol "FIE" is normally examined at this point to determine whether it is a function, a macro or a SPECIAL FORM.

In this exemplary embodiment, a LISP system according to the invention is used which is implemented without macros and without special forms, so that at this point it is not necessary to make distinctions in this respect. This could be effected, for example, by an access to the identification entry of the symbol and an access to the link header in which such a marking can be entered in the identifier entry of the data entry 10.1.

Accordingly, the symbol "FIE" is to be interpreted as a function in this exemplary embodiment. The interpreter consequently evaluates the arguments of the function. The variable "X" is evaluated, and this supplies the value "3". At the following function call of the function "FIE" this value is transferred in a register. For the function call, the identification entry 2.FIE is accessed to locate the link header, with the link header being accessed to locate the execution code, which is executed after an execution transition at the program connector 53. In this case, the execution code 3.FAULT is executed as program block 50.03, so that the error message "function FIE is undefined" is prepared. The execution instructions of the program block 50.03 are identical here to those already illustrated in FIG. 3.2.

The execution transition to the printer of the interpreter and into the input/output system takes place at the program connector 115.

The execution instructions already illustrated in FIG. 3.2 are executed here between the program connectors 53 and 115.

As FIG. 5.1 shows, the program section 50.20 follows the program connector 52. A reference to the source program is brought into the stack. In this case this is the source program "(LAMBDA (X) (FIE X))". Program section 50.21 follows. The individual arguments of the called function are successively brought into the stack. In this case only the argument "X" need be brought into the stack. Program section 50.22 then follows. An execution transition to the evaluator of the interpreter takes place at the program connector 110. The interpreter links the transfer values, in this case "3", to the parameter "X" of the source program. The source program is then evaluated. The arguments are evaluated for the function "FIE". In this case the variable "X" is evaluated. This supplies the value "3". The function "FIE" is then called by means of access to the identification entry 2.FIE, access to the link header 1.FAULT and the execution transition to the execution code 3.FAULT, cf. FIG. 4.

Figure 6:
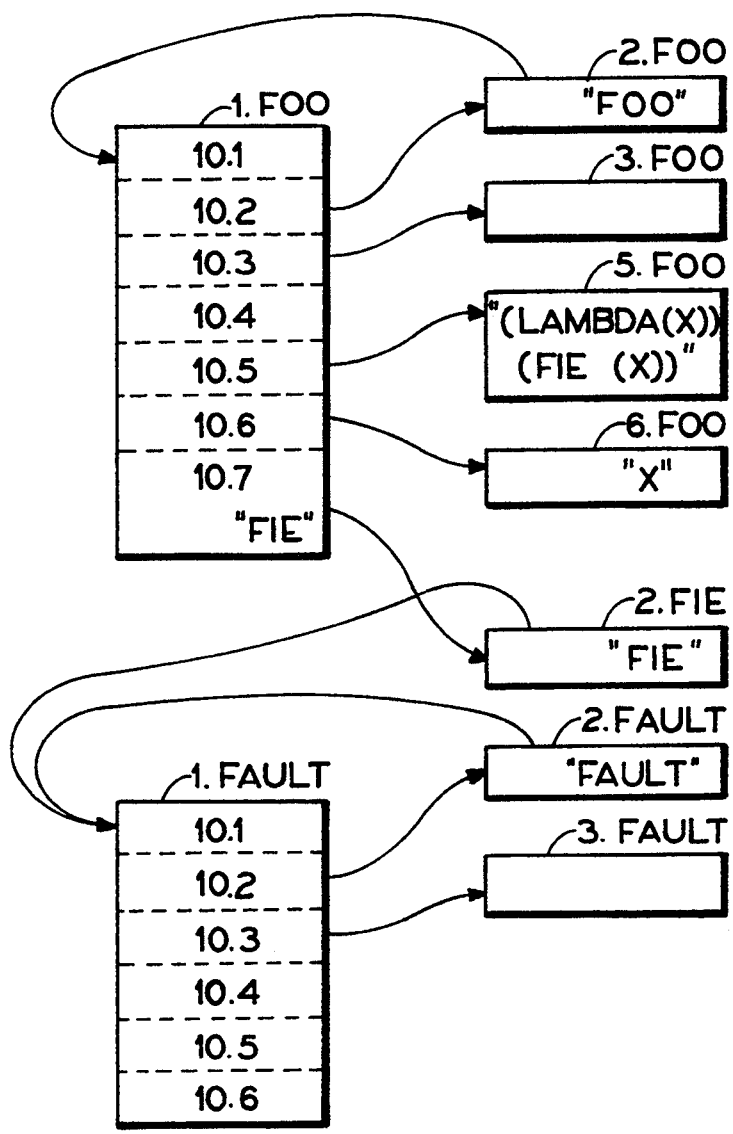
FIG. 6 shows a data structure for a compiled function "FOO" and an as yet undefined function "FIE".

As FIG. 6 shows, before the fifth input and after the fourth input of this exemplary embodiment, the identification entry 2.FOO, to which a link header 1.FOO is chained, for this exemplary embodiment is provided for the function "FOO" defined as compiled. Said link header contains a data entry 10.1, by means of which said link header 1.FOO is marked as a G vector with its length. The link header 1.FOO furthermore contains a data entry 10.2, by means of which the identification entry 2.FOO is chained to the link header 1.FOO. The link header 1.FOO furthermore contains a data entry 10.3, by means of which an execution code 3.FOO is chained to the link header 1.FOO. The execution code 3.FOO is here an I vector which contains execution instructions, by means of which, when the function "FOO" defined as compiled is called, the result of the compilation of the function "FOO" can be called as a function code. Although a further data entry 10.4 of the function header 1.FOO can be used by the execution code 3.FOO as a link to an environment block, in this exemplary embodiment a link is entered to "NIL". The function header 1.FOO contains a further data entry 10.5, which as before contains the source program. However this is not used. The function header 1.FOO contains a further data entry 10.6, by means of which the names of the parameters of the defined function are chained to the function header 1.FOO. The latter is provided for debugging purposes but is not used in this exemplary embodiment. In this exemplary embodiment, the transferred parameter "3" is to be linked to the argument "X" of the function "FOO". The function header 1.FOO contains a further data entry 10.7, at which the function "FIE" to be called internally is entered when the function "FOO" is compiled. In accordance with the length specification in the data entry 10.1, according to the definition of the compiled function further functions to be called can also be provided in the form of data entries 10.7. In this exemplary embodiment, only an internal function is to be called for the function "FOO", namely the function "FIE". For this reason, a link to an identification entry 2.FIE is provided in the data entry 10.7 for the symbol "FIE".

The same data structure as before, which is illustrated in FIG. 4.2, is provided for the symbol "FIE", for which as yet no function has been defined at this time.

Figure 7:
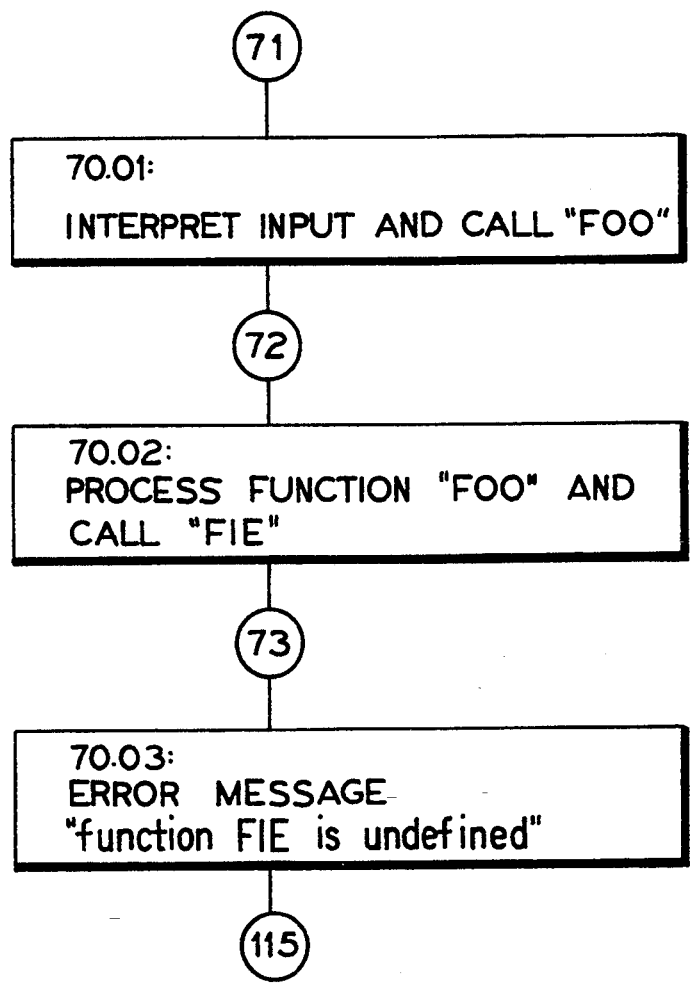
FIG. 7 shows a flowchart for an entered call of a compiled function "FOO" which calls an as yet undefined function "FIE".

As FIG. 7 shows, the illustrated program operations, which are combined into program blocks for an overview in FIG. 7, follow after the fifth input.

As FIG. 7 shows, the program block 70.01 is executed, beginning with the program connector 71. The fifth input "(FOO 3)" of this exemplary embodiment is processed, cf. FIG. 1.1. This input is interpreted. The input parameter "3" is prepared for parameter transfer. The input symbol "FOO" is defined as a compiled function at this time. As already illustrated in FIG. 3.1, the program sections for the preparation of the input parameter "3", for access to the identification entry 2.FOO, for access to the link header 1.FOO, and for the execution transition to the execution code 3.FOO, which in this case is executed after an execution transition at the program connector 72, follow.

Beginning with the program connector 72, the program block 70.02 follows. The compiled execution code 3.FOO of the function "FOO" is executed. The data entry 10.7 of the link header 1.FOO is accessed for calling the internal function "FIE", cf. FIG. 6, which references the identification entry 2.FIE. The identification entry 2.FIE is accessed, which at this time references the link header 1.FAULT. The data entry 10.3 of the link header 1.FAULT is accessed, which refers to the execution code 3.FAULT. The execution transition to the execution code 3.FAULT takes place at the program connector 73.

Beginning with the program connector 73, program block 70.03 follows. The instructions illustrated in FIG. 3.2 follow, and the error message "function FIE is undefined" is prepared. The execution transition to the printer of the interpreter and into the input/output system takes place at the program connector 115.

As FIG. 8.1 shows, before the tenth input and after the ninth input of this exemplary embodiment, the identification entry 2.FOO, to which the link header 1.FOO is chained, is provided for the function "FOE)" defined as compiled. Said link header contains the data entry 10.2, by means of which the identification entry 2.FOO is chained to the link header 1.FOO. The link header 1.FOO furthermore contains the data entry 10.3, by means of which the compiled execution code 3.FOO of the function "FOO" is chained to the link header 1.FOO. The link header 1.FOO furthermore contains the data entry 10.7, which references the identification entry 2.FIE of the symbol "FIE".

The link header 1.FIE is chained to the identification entry 2.FIE. The former contains the data entry 10.2, by means of which the identification entry 2.FIE is chained to the link header 1.FIE. The link header 1.FIE furthermore contains the data entry 10.3, by means of which the execution code 3.INTER is chained to the link header 1.FIE as interpreter interface. The link header furthermore contains the data entry 10.5, by means of which the source program 5. FIE is chained to the link header 1.FIE in the form of the LAMBDA list "(LAMBDA (Y) (FEE Y))".

As FIG. 8.2 shows, at this time the link header 1.FEE is chained to the identification entry 2.FEE of the symbol "FEE". The link header 1.FEE contains the identification entry 10.2, by means of which the identification entry 2.FEE is chained to the link header 1.FEE. The link header 1.FEE furthermore contains the data entry 10.3, by means of which the execution code 3.INTER is chained to the link header 1.FEE as interpreter interface. The link header 1.FEE furthermore contains the data entry 10.5, by means of which the source program 5.FEE is chained to the link header 1.FEE in the form of the LAMBDA list "(LAMBDA (Z) (2+Z))".

As FIG. 8.3 shows, at this time the identification entry 2.2PLUS, to which the link header 1.2PLUS is chained, is provided for the function "2+" defined as compiled. Said link header contains the data entry 10.2, by means of which the identification entry 2.2PLUS is chained to the link header 1.2PLUS. The link header 1.2PLUS furthermore contains the data entry. 10.3, by means of which the compiled execution code 3.2PLUS is chained to the link header 1.2PLUS. The link header 1.2PLUS furthermore contains the data entry 10.7, which references the identification entry 2.PLUS of the symbol "+".

In this exemplary embodiment, the identification entry 2.PLUS, to which a link header 1.PLUS is chained, is provided for the function "+" defined as a system function. Said link header contains a data entry 10.1, by means of which said link header 1.PLUS is marked as a G vector with its length. The link header 1.PLUS furthermore contains a data entry 10.2, by means of which the identification entry 2.PLUS is chained to the link header 1.PLUS. The link header 1.PLUS furthermore contains a data entry 10.3, by means of which an execution code 3.PLUS is chained to the link header 1.PLUS. The execution code 3.PLUS is here an I vector which contains execution instructions, by means of which the system function "+" is executed when the execution code is called. In this exemplary embodiment, a further data entry 10.4 of the link header 1.PLUS can be used by the execution code 3.PLUS as a link to an environment block 4.PLUS. The link header 1.PLUS contains a further data entry 10.5, which normally references a source program. No source program is provided with system functions, and therefore this is equal to "NIL". The link header 1.PLUS contains a further data entry 10.6, by means of which the names of the parameters of the system function are chained to the function header 1.PLUS. In this exemplary embodiment two parameters are to be linked to the two arguments of the system function "+". The function header 1.PLUS contains further data entries 10.7 which reference internal functions, constants and symbols for the system function "+".

Figure 9:
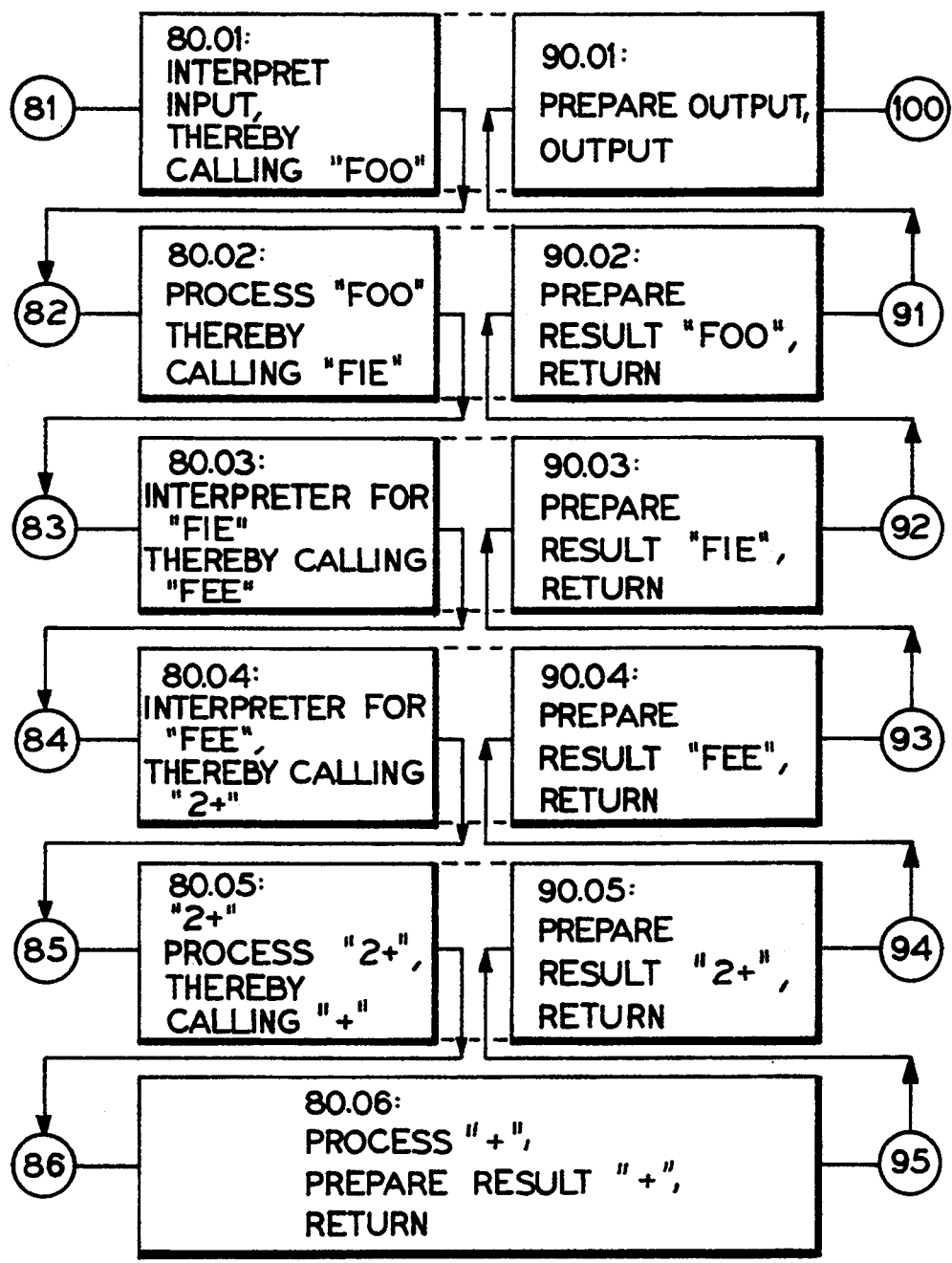
FIG. 9 shows a flowchart for an entered call of a compiled function "FOO", which calls an interpretable function "FIE", which calls an interpretable function "FEE", which calls a compiled function "2+", which calls a system function "+".

As FIG. 9 shows, the program operations, which are combined into program blocks for an overview, follow after the tenth input and before the output of the result.

Beginning with a program connector 81, the program block 80.01 is executed. The tenth input "(FOO 3)" is processed. The input parameter "3" is prepared for parameter transfer for the called function "FOO". The program transition then takes place at the program connector 82 to call the function "FOO". Beginning with the program connector 82, the program block 80.02 follows. The function "FOO" which is called and which is present in compiled form at this time is processed. To call the function "FIE", the data entry 10.7, which references the identification entry 2.FIE of the symbol "FIE", is accessed by the compiled execution code 3.FOO in the link header 1.FIE. After these have been accessed, the link header 1.FIE is accessed. The latter references the execution code 3.INTER. The execution transition to the execution code 3.INTER found in this manner takes place at the program connector 83.

The program block 80.03 is executed. A reference to the source program 5.FIE, which is equal to "(LAMBDA (y) (FEE y))", chained to the link header 1.FIE is brought into the stack by the execution code 3.INTER. The transferred value "3" is then brought into the stack. The execution transition to the evaluator of the interpreter takes place. The latter links the value "3" to "Y", the parameter of the source program. The function body of this source program, which is equal to "(FEE Y)", is evaluated. The variable "Y" is evaluated. This supplies the value "3". The function "FEE" is to be called. The stack operations for the parameter transfer follow. The identification entry 2.FEE of the symbol "FEE" is accessed. The link header 1.FEE, to which the execution code 3.INTER is chained, is then accessed. The execution transition to the execution code 3.INTER follows at the program connector 84.

The program block 80.04 is executed. The source program 5.FEE, which is equal to "(LAMBDA (Z) (2+Z))", chained to the link header 1.FEE is brought into the stack by the execution code 3.INTER. The transferred value "3" is then brought into the stack. The execution transition to the evaluator of the interpreter takes place. The latter links the value "3" to "Z", the parameter of the source program. The function body "(2+Z)" is evaluated. The variable "Z" is evaluated as "3". After the stack operations for the parameter transfer, the function "2+" is called. The identification entry, 2.2PLUS of the symbol "2+" is accessed, and then the link header 1.2PLUS, to which the compiled execution code 3.2PLUS of the function "2+" is chained, is accessed. The execution transition to the execution code 3.2PLUS takes place at the program connector 85.

The program block 80.05 is executed. The system function "+" is called by the execution code 3.2PLUS. In the link header 1.2PLUS, the data entry 10.7 is accessed, which references the identification entry 2.PLUS of the symbol "+", to which the link header 1.PLUS is chained, to which in turn the execution code 3.PLUS of the system function "+" is chained. The execution transition to the execution code 3.PLUS found in this manner takes place at the program connector 86.

Beginning with the program connector 86, the program block 80.06 follows. The called function "+" is processed. The parameters "3" and "2" transferred for the function "+" are combined in the manner of an addition. The parameter "5" is prepared for transfer as the result for the called function "+". The program transition then takes place as a return at the program connector 95.

Beginning with the program connector 95, the program block 90.05 follows. The parameter "5" transferred as the result of the called function "+" is processed. The transferred parameter "5" is prepared for further transfer as the result for the called function "2+". The program transition then takes place as a return at the program connector 94. Beginning with the program connector 94, the program block 90.04 follows. The parameter "5" transferred as the result of the called function "2+" is processed by the interpreter and prepared for further transfer. After execution of the stack operations, the return from the interpreter takes place at the program connector 93. The execution transition from the interpreter into the interpreter then takes place. As with the function call, stack pointers are changed at the return.

Program block 90.03 follows. The parameter "5" transferred as the result of the called function "FEE" is processed by the interpreter and prepared for further transfer. After execution of the stack operations, the return from the interpreter into the compiled execution code 3.FOO of the function FOO takes place at the program connector 92.

Program block 90.02 follows. The parameter "5" transferred as the result of the called function "FIE" is prepared for further transfer. The return from the compiled execution code 3.FOO of the function "FOO" then takes place at the program connector 91.

Program block 90.01 follows. The parameter "5" transferred as the result of the called function "FOO" is prepared for the output of the result.

For the output, the program transition to the printer of the interpreter and into the input/output system of this exemplary embodiment then takes place at the program connector 100.

The program blocks 80.01 and 90.01 are provided here as a part of a program complex for processing inputs/outputs. In relation to the hierarchy of the function calls with their internal function calls, the term "TOP" or "TOP-LEVEL" is frequently used for these program blocks.

The program blocks 80.02 and 90.02 are provided as compiled execution code 3.FOO for processing the function "FOO".

The program blocks 80.03 and 90.03, and likewise the program blocks 80.04 and 90.04, are formed by the interpreter interface 3.INTER and by the interpreter. The program blocks 80.03 and 90.03 are provided here for executing the called function "FIE", which at this time is defined as interpretable, and calls the function "FIE" as internal function call. The program blocks 80.04 and 90.04 are provided for executing the called function "FEE", which at this time is defined as interpretable, and calls the function "2+" as internal function call.

The program blocks 80.05 and 90.05 are provided as execution code 3.2PLUS for processing the function "2+". The program block 80.06 is provided as execution code 3.PLUS for processing the system function "+".

In this exemplary embodiment, and in connection with the figures, the following reference symbols are used here:

| | |
|---|---|
| 1 | Link header, function header |
| 2 | Identification entry |
| 3 | Execution code |
| 4 | Environment block |
| 5 | List of the function source to be interpreted |
| 6 | List of parameters |
| 10 | Data entry in the link header |
| 30,50,70,80,90 | |
| | Program section, program block |
| 31,32,51,52,53,71,72,73,81,82,83,84,85, | |
| 86,91,92,93,94,95,100,110,115 | |
| | Program connectors |
| 900 | Personal computer |
| 910 | Screen |

It can be demonstrated in this exemplary embodiment that as a result of the method according to the invention in an interactive system, program elements can be used by means of accesses to a link header without a status inquiry being required. This confers particularly significant advantages with respect to a greatly reduced program runtime as a result of the omission of the very complex status inquiries in interactive systems hitherto.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method in a computer implemented process for dynamically linking program elements of an interactive data processing system, that is capable of defining operations of the interactive data processing system by the program elements, comprising the steps of:
    a) generating and assigning, before run-time of a program that utilizes the program elements, a link header to each program element as a data block for storing chaining information,
    b) chaining, before the run-time of the program, a first execution code to the link header via the chaining information,
    c) if for any program element a respective first execution code is altered to a second execution code by operation of the interactive data processing system during the run-time of the program, regenerating the link header, replacing the respective first execution code with the generated second execution code, the regenerated link heater assigning the second execution code to the respective program element,
    d) when a program element is executed by operation of the data processing system during the run-time of the program, accessing a respective chained execution code via a respective assigned link header and executing the respective chained execution code.

2. The method as claimed in claim 1, wherein the method further comprises, before the run-time of the program and after step a) and before step b), the step of providing to each program element a data entry referencing the link header, and wherein a respective data entry is used during run-time of the program to locate the link header in the interactive data processing system.

3. The method as claimed in claim 1, wherein a respective execution code that is chained to a respective link header is a predetermined execution code selected from the following execution codes:
    a) an error interface to an error handling program for an as yet undefined or no longer defined program element,
    b) a simulator interface to a simulator program for a program element to be simulated,
    c) an interpreter interface to an interpreter program for a program element to be interpreted,
    d) a compiled program sequence for a compiled program element.

4. The method as claimed in claim 3, wherein the interactive data processing system is a LISP system.

5. The method as claimed in claim 4, wherein the method further comprises entering into a respective link header of a respective program element a data entry as an identifier entry of the respective link header with a length specification for the respective link header.

6. The method as claimed in claim 4, wherein the method further comprises entering into a respective link header of a respective program element a data entry as link to an identification entry of a symbol which is associated with the respective program element.

7. The method as claimed in claim 4, wherein the method further comprises entering into a respective link header of a respective program element a data entry as link to the respective execution code.

8. The method as claimed in claim 4, wherein the method further comprises entering into a respective link header of a respective program element a data entry as link to an environment block.

9. The method as claimed in claim 4, wherein the method further comprises entering into a respective link header of a respective program element a data entry as link to a function source.

10. The method as claimed in claim 4, wherein the method further comprises entering into a respective link header of a respective program element a data entry as link to parameters.

11. The method as claimed in claim 4, wherein the method further comprises entering into a respective link header of a respective program element a data entry as link to a symbol or a constant which is used by the respective program element.

* * * * *